(12) United States Patent
Li et al.

(10) Patent No.: US 12,095,364 B2
(45) Date of Patent: Sep. 17, 2024

(54) VOLTAGE REGULATOR WITH REDUCED POWER LOSS AND CHIP USING THE VOLTAGE REGULATOR

(71) Applicant: MEDIATEK INC., Hsinchu (TW)

(72) Inventors: Chih-Chen Li, Hsinchu (TW); Jin-Yan Syu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/063,726

(22) Filed: Dec. 9, 2022

(65) Prior Publication Data

US 2023/0402915 A1    Dec. 14, 2023

Related U.S. Application Data

(60) Provisional application No. 63/350,130, filed on Jun. 8, 2022.

(51) Int. Cl.
*H02M 3/07* (2006.01)
(52) U.S. Cl.
CPC ..................... *H02M 3/07* (2013.01)
(58) Field of Classification Search
CPC ........................................................ H02M 3/07
See application file for complete search history.

(56) References Cited

U.S. PATENT DOCUMENTS 10,084,384 B1 *  9/2018  Kotikalapoodi ...... H02M 3/158
10,615,692 B2     4/2020  Khayat et al.
11,228,243 B2 *  1/2022  Petersen ............... H02M 1/088
11,251,708 B2 *  2/2022  Park ....................... H02M 3/07
(Continued)

FOREIGN PATENT DOCUMENTS

DE    102020213004 A1 * 12/2021 ............ H02M 1/088
JP         2011-78146 A     4/2011
(Continued)

OTHER PUBLICATIONS

Shenoy, P., et al.; "A 5 MHZ, 12 V, 10 A, Monolithically Integrated Two-Phase Series Capacitor Buck Converter" (published in Mar. 2016).

(Continued)

*Primary Examiner* — Sibin Chen
(74) *Attorney, Agent, or Firm* — McClure, Qualey & Rodack, LLP

(57) ABSTRACT

A down-converted voltage regulator is provided. The first energy storage element provides a pre-charged voltage between a connection terminal and a ground terminal during the first phase. The second energy storage element has a first terminal, and it has a second terminal coupled to the output terminal of the voltage regulator. The third energy storage element is coupled between the output terminal of the voltage regulator and the ground terminal. During the first phase, the first terminal of the second energy storage element is coupled to the first energy storage element through the connection terminal to receive the pre-charged voltage. During the second phase, the first energy storage element is coupled between the input terminal and the output terminal of the voltage regulator to be pre-charged to store the pre-charged voltage, and the first terminal of the second energy storage element is coupled to the ground terminal.

18 Claims, 3 Drawing Sheets

(56) References Cited

U.S. PATENT DOCUMENTS

| | | | |
|---|---|---|---|
| 11,329,553 | B2 | 5/2022 | Lin et al. |
| 11,682,966 | B2 | 6/2023 | Liu et al. |
| 2019/0312511 | A1 | 10/2019 | Crossley et al. |
| 2020/0144909 | A1* | 5/2020 | Baek .................. H02M 3/07 |

FOREIGN PATENT DOCUMENTS

| | | |
|---|---|---|
| TW | 202130103 A | 8/2021 |
| TW | 202144947 A | 12/2021 |

OTHER PUBLICATIONS

Extended European Search Report dated Oct. 19, 2023, issued in application No. EP 23174119.0.
Chinese language office action dated Jan. 4, 2024, issued in application No. TW 112119124.

* cited by examiner

VOLTAGE REGULATOR WITH REDUCED POWER LOSS AND CHIP USING THE VOLTAGE REGULATOR

CROSS REFERENCE TO RELATED APPLICATIONS

This application claims the benefit of U.S. Provisional Application No. 63/350,130, filed Jun. 8, 2022, the entirety of which is incorporated by reference herein.

BACKGROUND OF THE INVENTION

Field of the Invention

The present invention relates to voltage regulators.

Description of the Related Art

ACR (the ac resistance of an inductor) loss, conduction loss, switching loss, and other problems may cause excessive power consumption in a voltage regulator.

How to reduce power loss in a voltage regulator is an important topic in this field of technology.

BRIEF SUMMARY OF THE INVENTION

A voltage regulator down converting an input voltage to an output voltage in accordance with an exemplary embodiment of the present invention has an input terminal receiving the input voltage, and an output terminal outputting the output voltage. The voltage regulator further has three energy storage elements. The first energy storage element provides a pre-charged voltage between a connection terminal and a ground terminal during a first phase. The second energy storage element has a first terminal, and has a second terminal coupled to the output terminal of the voltage regulator. The third energy storage element is coupled between the output terminal of the voltage regulator and the ground terminal. During the first phase, the first terminal of the second energy storage element is coupled to the first energy storage element through the connection terminal to receive the pre-charged voltage from the first energy storage element. During a second phase, the first energy storage element is coupled between the input terminal and the output terminal of the voltage regulator to be pre-charged to store the pre-charged voltage, and the first terminal of the second energy storage element is coupled to the ground terminal.

The first energy storage element may include a capacitor. The second energy storage element may include an inductor. The third energy storage element may include a capacitor.

In an exemplary embodiment, the first energy storage element has a first terminal and a second terminal. During the first phase, the first terminal of the first energy storage element is coupled to the first terminal of the second energy storage element through the connection terminal, and the second terminal of the first energy storage element is coupled to the ground terminal. During the second phase, the first terminal of the first energy storage element is coupled to the input terminal of the voltage regulator, and the second terminal of the first energy storage element is coupled to the output terminal of the voltage regulator.

In an exemplary embodiment, the pre-charged voltage stored between the first terminal and the second terminal of the first energy storage element is the input voltage minus the output voltage.

In an exemplary embodiment, the duty cycle of the first phase is the ratio of the output voltage and the difference voltage. The difference voltage is the input voltage minus the output voltage.

In an exemplary embodiment, during the first phase, the second energy storage element is charged by the pre-charged voltage that is received from the first energy storage element.

In an exemplary embodiment, during the second phase, a discharge path for the second energy storage element is established and a discharging current from the first terminal of the second energy storage element to the second terminal of the second energy element is generated.

A chip in accordance with an exemplary embodiment of the present invention has the forgoing voltage regulator and a load circuit driven by the output voltage provided by the voltage regulator.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
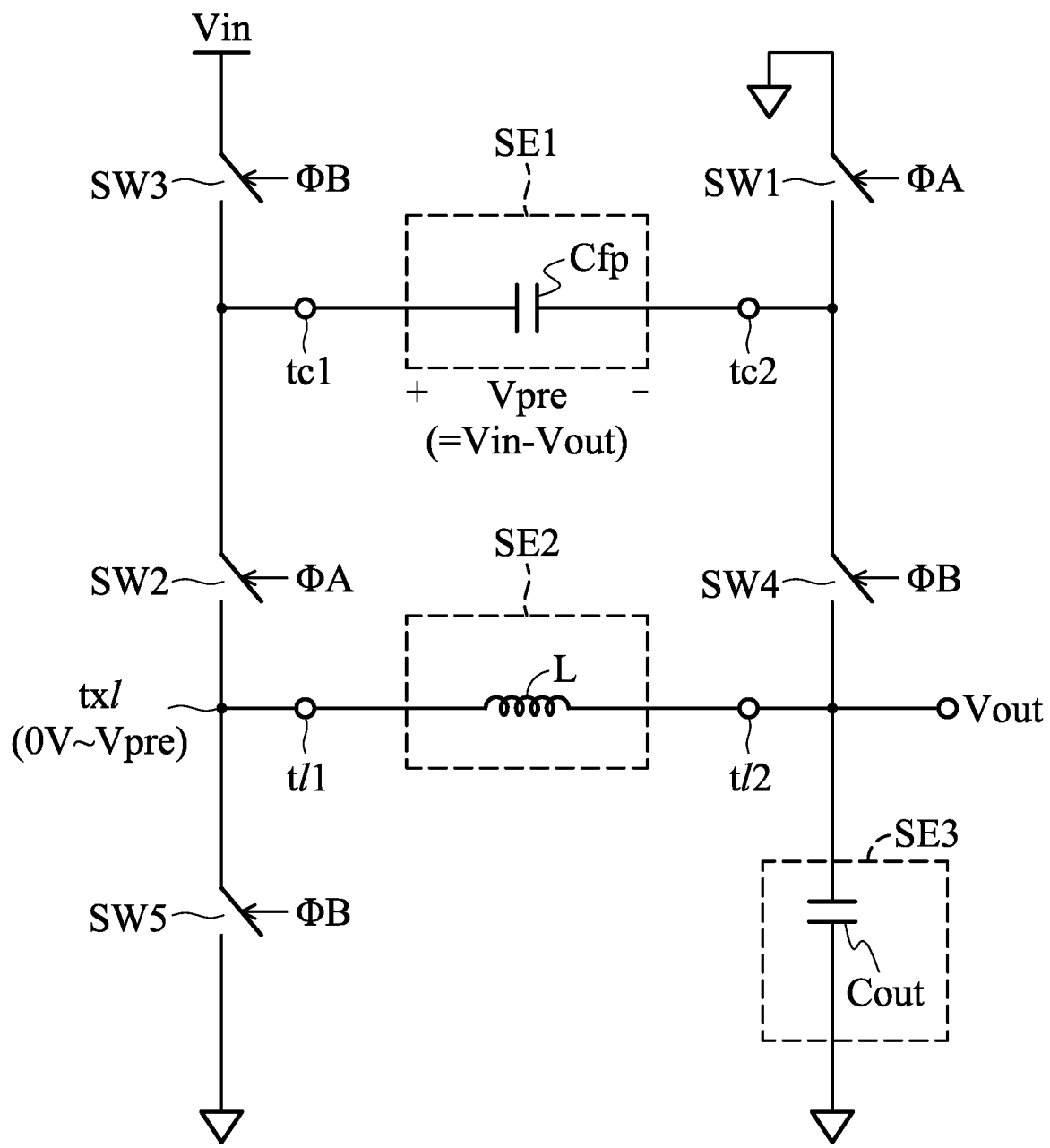
FIG. 1 illustrates a voltage regulator 100 in accordance with an exemplary embodiment of the present invention.

FIG. 1 illustrates a voltage regulator 100 in accordance with an exemplary embodiment of the present invention. The voltage regulator 100 down converts an input voltage Vin (received by an input terminal of the voltage regulator 100) to an output voltage Vout (output through an output terminal of the voltage regulator 100). The voltage regulator 100 has three energy storage elements (SE1, SE2, and SE3), and five switches SW1~SW5.

The first energy storage element SE1 includes a capacitor Cfp. The second energy storage element SE2 includes an inductor L. The third energy storage element SE3 includes a capacitor Cout. There may be modifications on any of the energy storage elements SE1, SE2, and SE3.

The first energy storage element SE1 has a first terminal tc1 and a second terminal tc2. The second energy storage element SE2 has a first terminal tl1 and a second terminal tl2. The second terminal tl2 of the second energy storage element SE2 is coupled to the output terminal (Vout) of the voltage regulator 100. The third energy storage element SE3 is coupled between the output terminal Vout of the voltage regulator 100 and the ground terminal.

The energy of the input voltage Vin is transferred to the first energy storage element SE1 first, and then coupled to the second energy storage element SE2 to regulate the output voltage Vout. The switches SW1 to SW5 are provided to implement the energy transferring.

Two phases are introduced to operate the voltage regulator 100.

The first switch SW1 and the second switch SW2 controlled by a signal ΦA are closed during a first phase, and may be open during a second phase. The third switch SW3, fourth switch SW4, and fifth switch SW5 controlled by a signal ΦB are closed during the second phase, and may be open during the first phase. Through the signals ΦA and B, the voltage regulator 100 is repeatedly switched between the first phase (e.g., enabled by ΦA) and the second phase (e.g., enabled by ΦB), and thereby generate the regulated output voltage Vout.

During the first phase (enabled by ΦA), the first switch SW1 couples the second terminal tc2 of the first energy storage element SE1 to a ground terminal, and the second switch SW2 couples the first terminal tc1 of the first energy storage element SE1 to the first terminal tl1 of the second energy storage element SE2 through a connection terminal tx1.

During the second phase (enabled by ΦB), the third switch SW3 couples the input terminal Vin of the voltage regulator 100 to the first terminal tc1 of the first energy storage element SE1, the fourth switch SW4 couples the second terminal tc2 of the first energy storage element SE1 to the output terminal Vout of the voltage regulator 100, and the fifth switch SW5 couples the first terminal tl1 of the second energy storage element SE2 to the ground terminal.

As for the first storage element SE1, the second phase (enabled by ΦB) is a pre-charging phase, wherein the first energy storage element SE1 is pre-charged to store a pre-charged voltage Vpre (e.g., Vin minus Vout). When being switched to the first phase (referring to ΦA), the pre-charged voltage Vpre (e.g., Vin minus Vout) is coupled to the connection terminal tx1 to be coupled to the second energy storage element SE2 that includes the inductor L. By switching between the first and second phases (by controlling the signals ΦA and ΦB), the voltage level at the connection terminal tx1 (i.e., the first terminal of the second storage element SE2) is changed between 0V and Vpre (=Vin-Vout). In comparison with a voltage range, 0V~Vin, conventionally supplied to drive an inductor of a conventional buck converter, the voltage range supplied to drive the second storage element SE2 of the present invention is suppressed to 0V~(Vin-Vout). Thus, the ripple of the current through the second storage element SE2 is successfully suppressed. The ACR loss is suppressed.

Figure 2B:
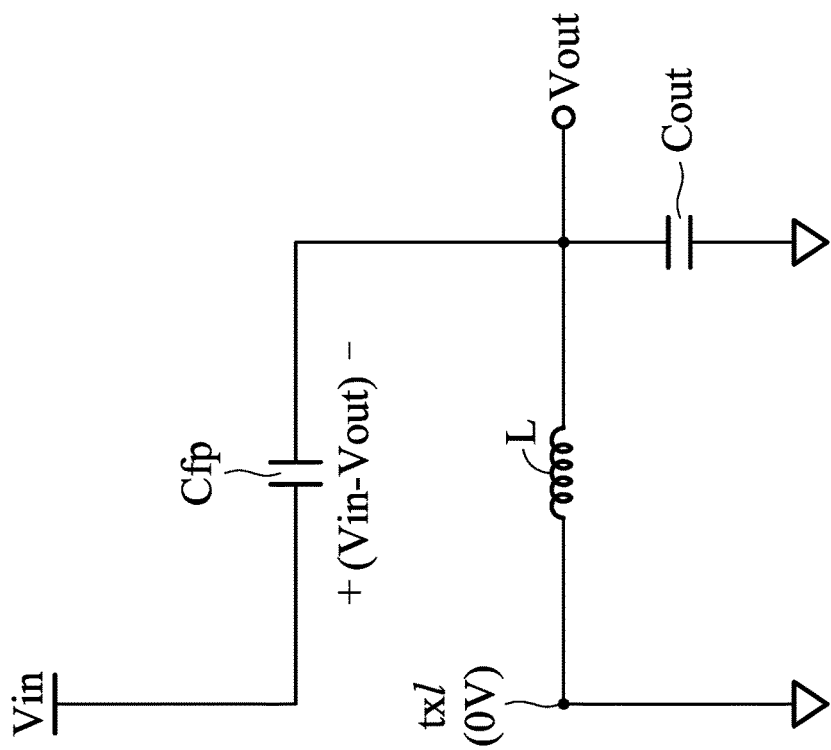
FIG. 2B shows the circuit connection of the voltage regulator 100 during the second phase (enabled by ΦB)
Figure 2A:
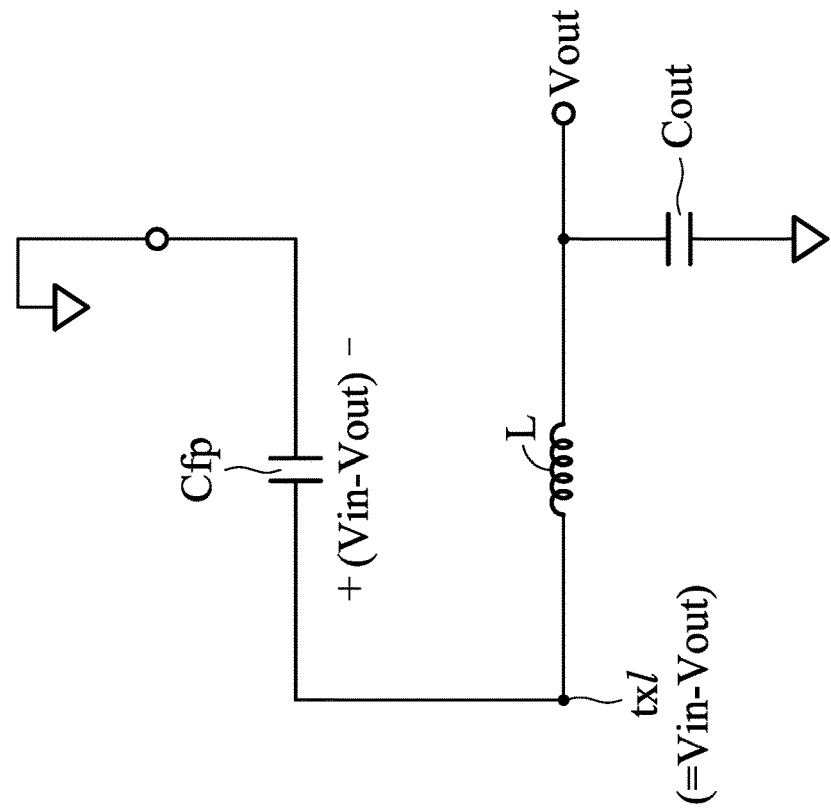
FIG. 2A shows the circuit connection of the voltage regulator 100 during the first phase (enabled by ΦA)

FIG. 2A shows the circuit connection of the voltage regulator 100 during the first phase (enabled by ΦA). FIG. 2B shows the circuit connection of the voltage regulator 100 during the second phase (enabled by ΦB).

Referring to FIG. 2B, during the second phase (enabled by ΦB), the capacitor Cfp (implementing the first energy storage element SE1) is coupled between the input terminal Vin and the output terminal Vout of the voltage regulator 100 to be charged to store the pre-charged voltage (Vin-Vout), and the connection terminal tx1 (at one end of the inductor L, wherein the inductor L implements the second energy storage element SE2) is coupled to the ground terminal (0V).

Referring to FIG. 2A, during the first phase (enabled by ΦA), the inductor L is coupled to the capacitor Cfp through the connection terminal tx1 to receive the pre-charged voltage (Vin-Vout) from the capacitor Cfp. The inductor L is charged by the pre-charged voltage (Vin-Vout) received from the capacitor Cfp, and the connection terminal tx1 (at one end of the inductor L) is changed to (Vin-Vout).

FIG. 2A and FIG. 2B clearly show that the voltage range at the connection terminal tx1 (at one end of the inductor L) is suppressed to 0V~(Vin-Vout), which is a smaller swing in comparison with a conventional voltage range 0V~Vout supplied to one end of an inductor of a conventional buck converter. The current ripple through the inductor L is significantly reduced. The ACR loss is successfully suppressed in the proposed voltage regulator.

By switching the voltage regulator between the first phase (enabled by ΦA) and the second phase (enabled by ΦB), a regulated output voltage Vout is generated at the output terminal of the voltage regulator.

Note that during the second phase (enabled by ΦB) wherein a discharge path for the inductor L (the second energy storage element) is established (a discharging current from tl1 to tl2), the capacitor Cfp (the first energy storage element SE1) also shares the current loading of the voltage regulator. Thus, in comparison with the conventional techniques, the average current through the inductor L is significantly reduced. The conduction loss ($I^2R$) is successfully suppressed in the proposed voltage regulator.

A duty cycle of the first phase (enabled by ΦA) is a ratio of the output voltage Vout to a difference voltage (Vin-Vout).

There may be other circuit modifications on the proposed voltage regulator. Any voltage regulator using switches to pre-charge an energy storage element based on the input voltage Vin and transfer the pre-charged voltage from the energy storage element to an inductor L to generate the regulated output voltage Vout should be considered within the scope of the present invention.

Figure 3:
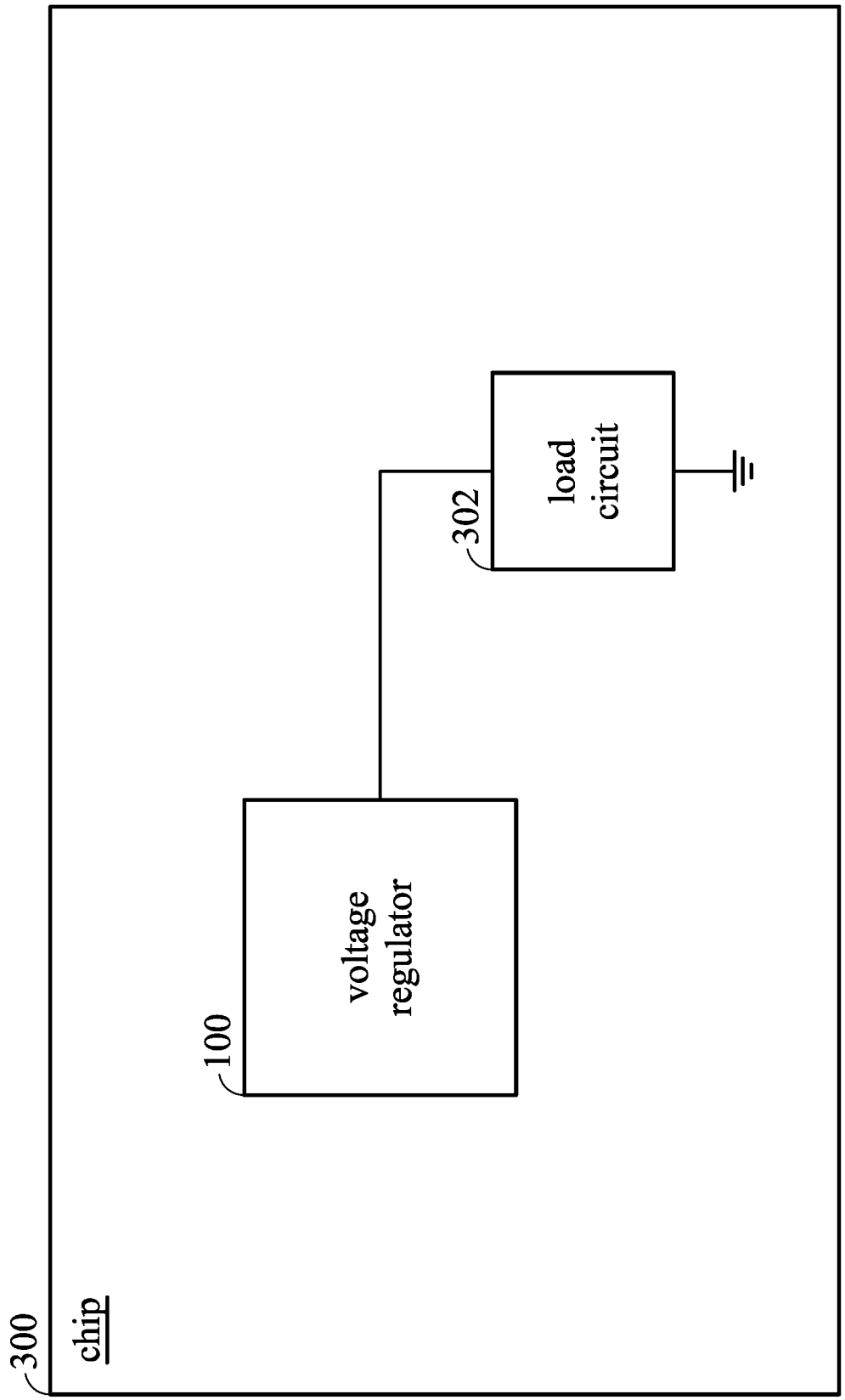
FIG. 3 is a block diagram illustrating a chip 300 in accordance with an exemplary embodiment of the present invention.

FIG. 3 is a block diagram illustrating a chip 300 in accordance with an exemplary embodiment of the present invention. The chip 300 uses the proposed voltage regulator 100 to provide the regulated output voltage Vout to drive a load circuit 302.

Any chip using the voltage regular of the present invention should be considered within the scope of the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A voltage regulator, down converting an input voltage to an output voltage, comprising:
    an input terminal, receiving the input voltage;
    an output terminal, outputting the output voltage;
    a first energy storage element, providing a pre-charged voltage between a connection terminal and a ground terminal during a first phase;
    a second energy storage element, having a first terminal, and having a second terminal coupled to the output terminal of the voltage regulator; and
    a third energy storage element, coupled between the output terminal of the voltage regulator and the ground terminal;
    wherein:
    during the first phase, the first terminal of the second energy storage element is coupled to the first energy storage element through the connection terminal to receive the pre-charged voltage from the first energy storage element;

during the first phase, a first terminal of the first energy storage element is coupled to the connection terminal to be coupled to the first terminal of the second energy storage element, and a second terminal of the first energy storage element is coupled to the ground terminal;

during a second phase, the first energy storage element is coupled between the input terminal and the output terminal of the voltage regulator to be pre-charged to store the pre-charged voltage, the first terminal of the first energy storage element is disconnected from the first terminal of the second energy storage element, and the second terminal of the first energy storage element is disconnected from the ground terminal;

during the second phase, the first terminal of the second energy storage element is coupled to the ground terminal;

a duty cycle of the first phase is a ratio of the output voltage to a difference voltage; and the difference voltage is the input voltage minus the output voltage.

2. The voltage regulator as claimed in claim 1, wherein:
the first energy storage element includes a capacitor.

3. The voltage regulator as claimed in claim 1, wherein:
the second energy storage element includes an inductor; and
the third energy storage element includes a capacitor.

4. The voltage regulator as claimed in claim 1, wherein:
during the second phase, the first terminal of the first energy storage element is coupled to the input terminal of the voltage regulator, and the second terminal of the first energy storage element is coupled to the output terminal of the voltage regulator.

5. The voltage regulator as claimed in claim 4, wherein:
the pre-charged voltage stored between the first terminal and the second terminal of the first energy storage element is the input voltage minus the output voltage.

6. The voltage regulator as claimed in claim 4, further comprising:
a first switch, coupling the second terminal of the first energy storage element to the ground terminal during the first phase; and
a second switch, coupling the first terminal of the first energy storage element to the first terminal of the second energy storage element through the connection terminal during the first phase.

7. The voltage regulator as claimed in claim 6, wherein:
the first switch and the second switch are open during the second phase.

8. The voltage regulator as claimed in claim 7, wherein:
a third switch, coupling the input terminal of the voltage regulator to the first terminal of the first energy storage element during the second phase;
a fourth switch, coupling the second terminal of the first energy storage element to the output terminal of the voltage regulator during the second phase; and
a fifth switch, coupling the first terminal of the second energy storage element to the ground terminal during the second phase.

9. The voltage regulator as claimed in claim 8, wherein:
the third switch, the fourth switch, and the fifth switch are open during the first phase.

10. The voltage regulator as claimed in claim 9, wherein:
the first energy storage element includes a capacitor.

11. The voltage regulator as claimed in claim 9, wherein:
the second energy storage element includes an inductor; and
the third energy storage element includes a capacitor.

12. The voltage regulator as claimed in claim 1, wherein:
during the first phase, the second energy storage element is charged by the pre-charged voltage received from the first energy storage element.

13. The voltage regulator as claimed in claim 1, wherein:
during the second phase, a discharge path for the second energy storage element is established and a discharging current from the first terminal of the second energy storage element to the second terminal of the second energy element is generated.

14. A chip, comprising:
the voltage regulator as claimed in claim 1; and
a load circuit driven by the output voltage provided by the voltage regulator.

15. The chip as claimed in claim 14, wherein:
the first energy storage element of the voltage regulator includes a capacitor.

16. The chip as claimed in claim 14, wherein:
the second energy storage element of the voltage regulator includes an inductor; and
the third energy storage element of the voltage regulator includes a capacitor.

17. The chip as claimed in claim 14, wherein:
during the first phase, the second energy storage element is charged by the pre-charged voltage received from the first energy storage element.

18. The chip as claimed in claim 14, wherein:
during the second phase, a discharge path for the second energy storage element is established and a discharging current from the first terminal of the second energy storage element to the second terminal of the second energy element is generated.

* * * * *